(12) United States Patent
Paterson

(10) Patent No.: US 12,318,900 B2
(45) Date of Patent: Jun. 3, 2025

(54) PRESSURE RESPONSE OF HIGH PRESSURE FLUID VALVING, APPARATUS AND METHODS THEREFOR

(71) Applicant: GLOBALFORCE IP LIMITED, Auckland (NZ)

(72) Inventor: Ian Craig Paterson, Auckland (NZ)

(73) Assignee: GLOBALFORCE IP LIMITED, Aukland (NZ)

( * ) Notice: Subject to any disclaimer, the term of this patent is extended or adjusted under 35 U.S.C. 154(b) by 0 days.

(21) Appl. No.: 18/286,033

(22) PCT Filed: Apr. 8, 2022

(86) PCT No.: PCT/NZ2022/050036
§ 371 (c)(1),
(2) Date: Oct. 9, 2023

(87) PCT Pub. No.: WO2022/216161
PCT Pub. Date: Oct. 13, 2022

(65) Prior Publication Data
US 2024/0208020 A1 Jun. 27, 2024

(30) Foreign Application Priority Data
Apr. 8, 2021 (NZ) ........................... 774832

(51) Int. Cl.
*B25C 1/04* (2006.01)
(52) U.S. Cl.
CPC ............. *B25C 1/043* (2013.01); *B25C 1/042* (2013.01); *B25C 1/04* (2013.01)
(58) Field of Classification Search
CPC ............ B25C 1/04; B25C 1/042; B25C 1/043
See application file for complete search history.

(56) References Cited

U.S. PATENT DOCUMENTS 3,542,273 A * 11/1970 Granville ................ B25C 1/041
227/147
6,039,231 A 3/2000 White
(Continued)

OTHER PUBLICATIONS

Search Report for international application No. PCT/NZ2022/050036, dated Jun. 30, 2022.

*Primary Examiner* — Matthew Wiblin
(74) *Attorney, Agent, or Firm* — PEARL COHEN ZEDEK LATZER BARATZ LLP

(57) ABSTRACT

Disclosed is a system, method and apparatus operating on a high-pressure working fluid with high efficiency. The device has a reservoir of high-pressure working fluid. A fluid connection supplies the high-pressure working fluid at a controlled working pressure to a dose chamber to contain a volume of the high-pressure working fluid. A dose valve, biased to close, and able to be triggered open, is present between the dose chamber and a working chamber. A charge of the high pressure working fluid can be released from the dose chamber via the dose valve at a first end of the working chamber, to undergo a first expansion in the working chamber and do work therein to or towards a second end of the working chamber distal from the first end. The dose valve closes again before a pressure front of the charge in the working chamber has travelled less than or equal to halfway between the first end and the second end. This allows a second expansion of the charge to continue doing work. When the work is complete, the working chamber pressure is less than or equal to half the working pressure.

30 Claims, 15 Drawing Sheets

(56) References Cited

U.S. PATENT DOCUMENTS

| | | | | |
|---|---|---|---|---|
| 6,155,472 A | * | 12/2000 | Deziel | B25C 1/042 |
| | | | | 227/8 |
| 7,401,719 B2 | * | 7/2008 | Ou | B25C 1/041 |
| | | | | 227/107 |
| 2005/0077064 A1 | | 4/2005 | Oouchi et al. | |
| 2010/0072248 A1 | | 3/2010 | Lai et al. | |
| 2013/0082082 A1 | | 4/2013 | Tanji | |
| 2014/0158740 A1 | | 6/2014 | Akutsu et al. | |
| 2023/0065490 A1 | * | 3/2023 | Paterson | B25C 1/042 |

* cited by examiner

LATCHED

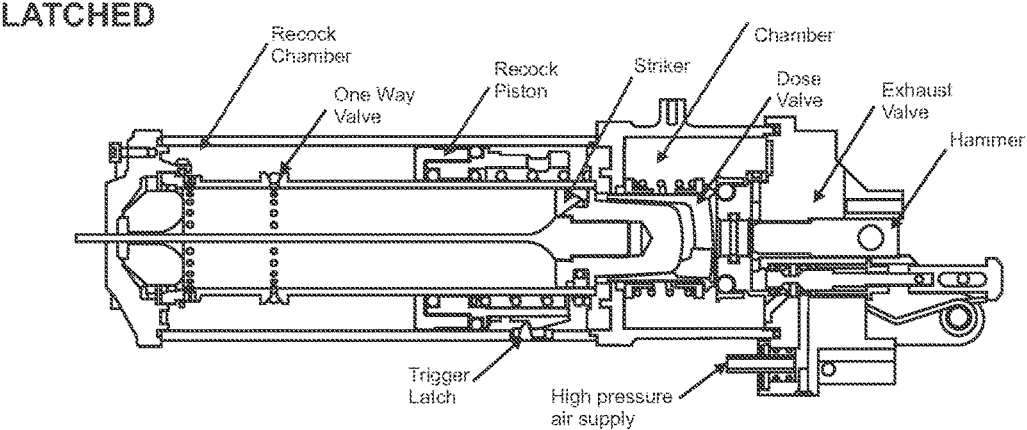

The dose system is held back in its latched position. The sequence will start as soon as the recock piston is released.

OPENING

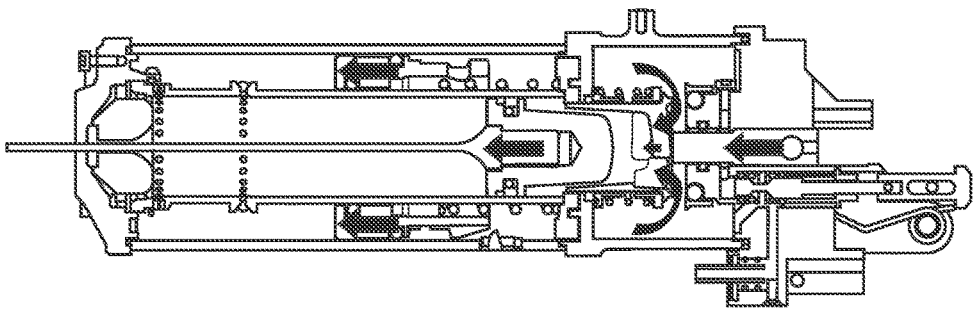

The recock piston is released accelerating the hammer, as they are rigidly connected. The hammer then strikes the dose valve allowing a high flow of air from the dose valve into the chamber behind the striker. This in turn accelerates the striker moving it forward.

DRIVING

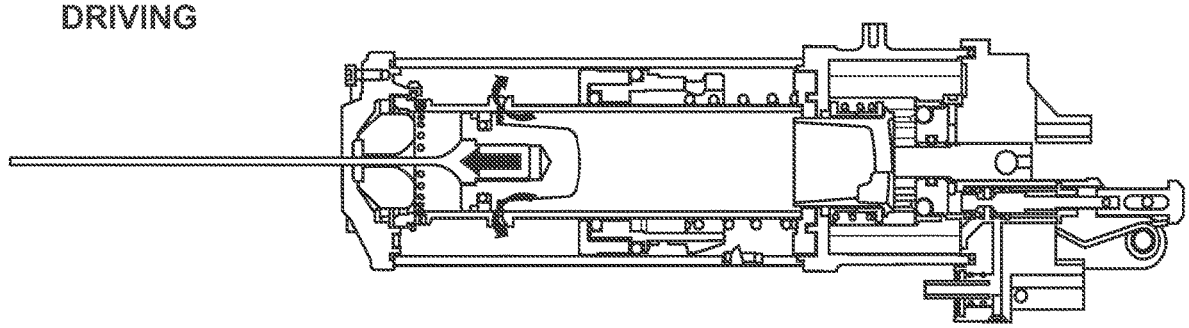

The striker passes the one way valve allowing air to flow in from behind the striker into the recock chamber.

(PRIOR ART)
Figure 1B

RECOCKING

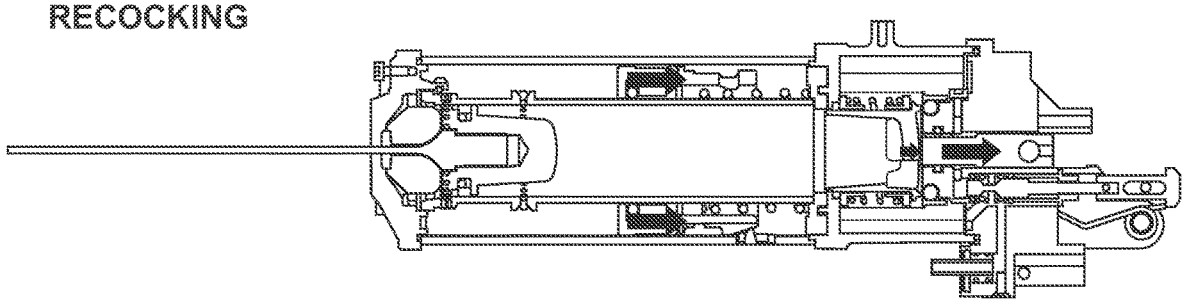

The pressure in the recock chamber pushes the recock piston and therefore the hammer back. This allows the dose valve to move back under the spring force and close

RETURNING

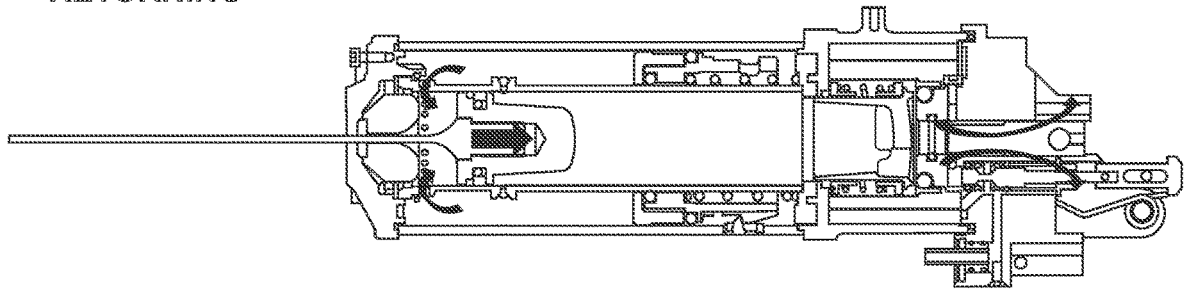

The hammer moves back past the exhaust valve, opening it. The high pressure air behind the striker is then released to atmosphere. This in turn creates a pressure differential across the striker moving it backwards.

RESET

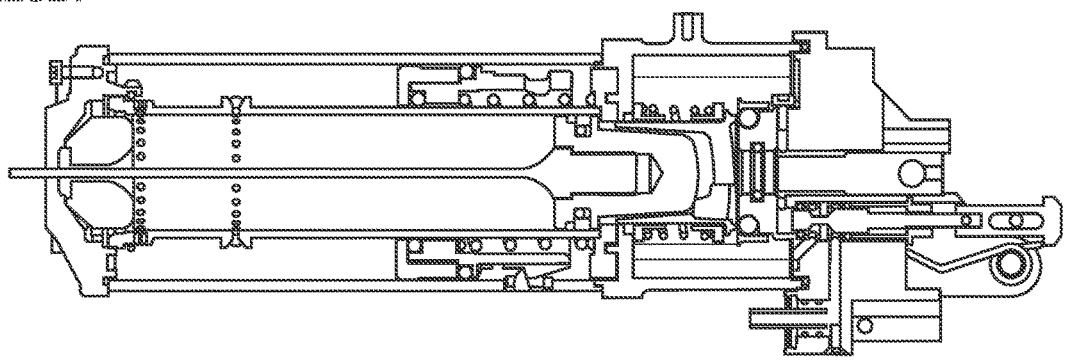

The striker moves back to its home position, returning the system to its original state.

(PRIOR ART)
Figure 1B (continued)

OPERATING PRESSURE ~ 40 bar
EXPANSION CHAMBERS
HIGH PRESSURE ~ 310 bar

PRESSURE RESPONSE OF HIGH PRESSURE FLUID VALVING, APPARATUS AND METHODS THEREFOR

CROSS-REFERENCE TO RELATED APPLICATIONS

This application is a National Phase Application of PCT International Application No. PCT/NZ2022/050036, International Filing Date Apr. 8, 2022, which claims priority of NZ Patent Application No. 774832 entitled "IMPROVEMENTS IN OR RELATING TO PRESSURE RESPONSE OF HIGH PRESSURE FLUID VALVING, APPARATUS AND METHODS THEREFOR", filed on Apr. 8, 2021, the entire contents of which are incorporated herein by reference.

TECHNICAL FIELD OF THE INVENTION

The present invention relates to devices, apparatus and methods that operate on or with a high-pressure fluid.

In particular, though not solely, the present invention is directed to improved efficiency of these devices, apparatus and methods when using a high-pressure operating fluid.

BACKGROUND OF THE INVENTION

There are many uses for a high-pressure fluid.

One such use is to extract work from the expansion of the high-pressure fluid, for example, but not limited to a gas such as air or carbon dioxide, or a compressible liquid. A supply of the high-pressure fluid is connected to the device and valving will control the supply of the high-pressure fluid from which the work can then be extracted.

Examples of such devices are, but not limited to, fastening tools, such as nail guns, traps for pest control, launch systems such as projectile launchers, valve systems such as flow control valves or actuators, whether high or low frequency opening or closing or operation cycles. Such devices may include a captive mass that work is done on, such as the piston in a nail gun, have an ejected mass (whether separate or combined with the projectile) such as in a projectile launcher that work is done on, or may act on, or controlled release of, a fluid, such as a gas or liquid.

In traditional air powered nail guns such as that shown in FIG. 1A or similar types of pneumatically actuated systems the device is tethered to a compressor or fixed air supply.

Nail guns are used to fire a nail into woodwork, metal, concrete or other materials to join or fasten them to another material. These traditional systems use gas pressure directly from the pressure source, acting behind and on a workload, such as a piston to drive the piston in a drive stroke from a start position, which in turn drives the fastener into the material. In front of the piston there is trapped air and this is compressed into a return chamber, which, once the fastener is driven into the material, sends the piston back to the beginning of the cycle in a return stroke, to a ready to fire position.

These traditional systems do not act as a closed expansion system which would allow the compressed gas to expand and lose its pressure as the system, in this case the piston, moves through the work or drive stroke. Instead, in these traditional systems, air is continuously supplied to keep pressure behind the piston as high as possible to maximise the energy of the drive stroke. At the end of the drive stroke the air pressure behind the piston is exhausted to atmosphere.

The volume of the compressed gas in the chamber behind the piston during the drive stroke verses the displacement of the piston down the chamber is shown in FIG. 2A for such a prior art traditional system.

The pressure of the compressed gas in the chamber, in the traditional system, as the piston travels down the drive stroke to do work essentially does not reduce, it is at, or near, the set pressure for the entire work or drive stroke. At the end of the drive stroke the compressed gas pressure behind the piston at almost the same pressure as at the start, and this high pressure compressed gas, is then exhausted to atmosphere. The exhausted air or gas being at such a high pressure indicates there is still significant energy in the exhausted gas, and this significant energy is therefore wasted.

This is important to the function of the tool, because if the pressure was not maintained at a high level, the lower pressure may not be sufficient to drive home the nail in the case of a fastening tool, or to consistently move a work load, or humanely dispatch a pest, or do the work of the device at the desired energy level or similar. This is of course dependent on the specific use case.

An improvement of the device shown in FIG. 1A is shown in FIGS. 1B and 1s the applicant's own fastening tool. This was a self-contained fastening tool that was not tethered, but rather used a self-contained tank of highly compressed air. The performance of this device is shown in FIG. 2B and shows a single expansion of the working fluid, illustrated by the single gradient of the volume versus movement down the working chamber in the graph. While the working fluid exhausted in this FIG. 1B tool is at a lower pressure than the set pressure of the tool, and so is an improvement over that of FIG. 1A, it is still exhausted at a pressure much greater than the surrounding atmospheric pressure, and again illustrates that energy is being wasted that could otherwise be harnessed in driving the workload or similar in the tool.

In the case of a fastening tool the substrate, nail type, chamber volumes and piston diameter implemented in a specific design effect performance. Similar dependencies will exist for each application of direct pressure applied systems. For example, in pest control applications the size and type of pest to be humanely dispatched, or for launcher applications the size of projectile and its distance to be ejected, or for pressure pulse applications the pressure requirement, wave spread, nozzle design and distance to target for a pressure wave.

It is evident in most designs that flow restrictions from the compressor to the working chamber are avoided. This suggests that the designers use the presence of the essentially unchanging (or only slightly reducing) typically 110 psi driving pressure supplied at high capacity (volume and flow rate) to avoid making the tool any larger/heavier than it needs to be. More specialised and slightly higher-pressure tools exist, but again these follow the same prior art design logic, and operate at 400-500 psi, e.g. those sold under the brand MAXX™ tools.

The 'type' of gas work mechanism these tools use can be thought of as akin to isobaric (that is no, or substantially no or low, pressure change during work stroke) expansion, but instead of adding heat into a closed system to maintain pressure while volume increases, more air is pushed into the system with no heat transfer occurring.

Another way to think about this type of expansion, is that the drive stroke doing work is actually many very small expansion events, but with each followed immediately by a small refill event, following the piston down the barrel. Depending on the tether length, diameter, and any flow restrictions it may be that the small 'refill' steps can't quite keep up with the expansion/pressure drop steps and there is a measurable small drop in pressure in the main air chamber, but at the end of the piston's movement it is very likely that the air flow will be able to catch up with the stopped piston, refilling the firing chamber and piston return chamber to full pressure before the main valve is closed, let alone before the exhaust and piston return stroke occur. It is expected that the intended functionality of most air driven tools is to have the piston return chamber and work chamber (barrel) completely pressurized to full pressure. Even if it is not vital for correct function that the work chamber and piston return chambers are fully charged in some designs, it would be up to the user to actuate the trigger fast enough to not pressurize both chambers fully which is not feasible due to the very short timescales for this action.

The air that fills the entire work chamber and piston return chamber at the end of a power/drive stroke is pressurized to essentially the same thermodynamic state as when it started the cycle. As stated earlier, there can be some (generally intentionally minimised) expansion of gasses during the work stroke which will result in some substantially adiabatic cooling means during the momentary pressure reduction.

As used in this specification "adiabatic" means expansion or compression with no heat exchange.

As used in this specification 'substantially' adiabatic, as no system is truly adiabatic, means there is always a tiny bit of heat transfer when a gas volume cools in an enclosed container, but it will be an inconsequential amount due to the short timescale. Therefore there will have been some adiabatic cooling of the gas as it expanded slightly during the work stroke, but that gas would be quickly compressed back to 110 PSI at the end of the work stroke, for example, by supply air from the compressor and would therefore experience the reverse compressive heating to almost the same temperature as before the cycle started.

While the total temperature change over the whole drive stroke is relatively small due to recompression, there will still be a small cooling effect on the tool housing due to the momentarily cooled gas during the momentary and partial expansion.

During the drive stroke the working fluid, for example air, experiences a short partially depressurized period as it is doing work (or many small depressurizations extending the previous analogy), and then it is re-pressurised as the flow capacity of the pressure supply system 'catches up'. Subsequently the volume of air in the work chamber, which is at, or very near, full pressure, is exhausted to atmosphere where it's capacity to do work is then wasted. Full pressure being the pressure that the working fluid is supplied to the device, for example from the compressor.

Air in the piston return chamber of typical pneumatic fastening tools during the exhaust phase does work to return the piston without replenishment from the compressor. This air undergoes effectively true adiabatic (single stage) expansion, and the associated temperature drop. This will be a significant contributor to the cooling experienced by the user when using tethered air nailers.

Another significant cooling effect is a result of the fully pressurised work chamber being exhausted to atmosphere, that gas expanding and cooling as it performs work on the atmosphere as it escapes from the exhaust porting of the tool, which must be done to allow the piston to be driven back to it's home position by the air in the piston return chamber.

Other prior art systems include some gas operated pest control traps such as 'Goodnature' traps. Important distinctions between pneumatic nailers and these traps is that their pneumatic mechanisms have a restriction between their energy supply and a 'dose chamber' which holds a charge of gas which is subsequently expanded into the work chamber.

However, the thermodynamic design of these units is much more similar to the nailer example as their design relies on a very large dose chamber in comparison to their work chamber. Since the operating pressures of these systems are comparatively low (significantly below 200 psi) they do not have the opportunity to expand that gas by a large multiple and still extract high energy, and so use a large dose chamber to make up for this, which in turn increases their overall size. The large dose chamber is also required to sustain high pressure force throughout the stroke for the crush style kill mechanism which is implemented in the design.

The short comings of such both architectures are similar—that very little of the compressed gas is allowed to undergo significant expansion and pressure drop, required to extract energy highly efficiently from compressed gas, before being exhausted to atmosphere at a still high pressure. Exhausting the compressed gas at a high-pressure state is inefficient as energy that is still present in the compressed gas is wasted by being vented to atmosphere.

In traditional fastening tools, there is one stage of the cycle which operates relatively efficiently (however only from a low pressure view point thereby limiting the expansion ratio). This is the piston return stroke as it occurs under relatively near adiabatic thermodynamic conditions because during the return stroke there is no additional gas supplied by the compressed air source. The piston return stroke only delivers a tiny fraction of the work done by the mechanisms in the tool. The vast majority of work (that is driving the fastener in, and compressing the return gas for the piston return stroke) in the device is completed by the drive stroke of the tool, not the piston return stroke.

It is important to note that these relatively inefficient mechanisms are viable in these applications because they have large and relatively cheap energy reservoirs to draw energy from.

In the case of a traditional fastening tool this is the tethered compressor which supplies the compressed air and is typically-nearby the user and is powered by either a combustion engine or electrical supply.

For the pest control trap disposable liquid CO2 canisters are utilised which employ a phase change fluid to supply the trap with a very large amount of gas to use. While both energy supply techniques are cheap and relatively practical means of liberating large amounts of energy, they both do so by a relatively inefficient means with associated environmental and supply chain limitations/requirements. Further the CO2 canisters are not refillable, and therefore either go to a waste stream, or must be recycled and therefore are costly.

Tethered systems for tools, and transport of disposable canisters are undesirable when portability or remote operation is required, for example in a construction site where workers must move around and up and down the site, or where trappers are required to hike into wilderness for long distances carrying their equipment, for example many small canisters of CO2.

Tethers can become tangled and add weight, drag, noise, trip or fall risk, and risk of puncture. Canisters add weight to packs and once used must be carried out as waste.

Also, the energy used by compressors which are used by inefficient tools and in the production of liquid CO2 will often be provided by non-environmentally friendly energy supplies, so improving the efficiency of mechanisms is invariably advantageous.

Untethering the nail gun from the compressor is desirable but hitherto, when using an air tank on the user, or tool, has not used the stored high-pressure operating fluid to its best efficiency. The inventor has recognised that even in its earlier implementation of such untethered fastening tools there is room for gains in efficiency and pressure response, through novel arrangements, which this patent seeks to address.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved pressure response for high pressure fluid systems, or to improve the efficiency of such systems and extract more energy from the high pressure fluid, or to overcome the above shortcomings or address the above desiderata, or to at least provide the public with a useful choice.

BRIEF DESCRIPTION OF THE INVENTION

In a first aspect the present invention consists in a system to operate on a high-pressure working fluid, comprising or including,
  A reservoir of high-pressure working fluid, with a fluid connection supplying the high-pressure working fluid at a controlled working pressure to,
  A dose chamber to contain a volume of the high-pressure working fluid,
  A dose valve, biased to close, and able to be triggered open, between the dose chamber and,
  A working chamber, into which a charge of the high pressure working fluid is released from the dose chamber via the dose valve at a first end of the working chamber, to undergo a first expansion in the working chamber and do work therein to or towards a second end of the working chamber distal from the first end, the dose valve closing again before a pressure front of the charge in the working chamber has travelled less than or equal to halfway between the first end and the second end, thereafter allowing a second expansion of the charge to continue doing work,
    the fluid connection having a flow restriction which is significantly less than a flow capacity of the dose valve,
  Wherein when the work is completed, the charge in the working chamber is at a pressure less than or equal to half the working pressure.

Preferably the volume of the dose chamber to the working chamber is at a ratio of 1 to 1.

Preferably the volume of the dose chamber to the working chamber is at a ratio range of 1 to 2 and 1 to 20.

Preferably the bias to close the dose valve is derived from fluid pressure, for example pressure acting on a pressure area, or a mechanical spring.

Preferably there is a pressure regulator between the reservoir and the dose chamber.

Preferably the pressure regulator and dose valve ensure the dose chamber consistently has at least one specified pressure or energy state, irrespective of the reservoir pressure while the reservoir is between a maximum allowable pressure and the selected or regulated working pressure.

Preferably the dose chamber is concentric to the working chamber.

Preferably the dose valve is concentric to the working chamber.

Preferably the reservoir could be a self-contained tank, or a tethered pressure supply from a high-pressure fluid source, such as a tank, compressor or the like external pressure supply.

Preferably the charge expands, pushes against and accelerates, a workload and the pressure front lies behind the workload, in the work chamber in order to extract work from the charge.

Preferably the dose valve is opened by a trigger which can be mechanical, pneumatic, electrical or any other means of opening the flow between the dose chamber and work chamber via the dose valve, and may be operated by hand, for example a finger trigger or by a machine.

Preferably the workload is captive, for example a piston or is non-captive for example a projectile.

Alternatively, there is no workload in the chamber as such, but rather the pressure front ejects from the working chamber to cause an effect external to the working chamber.

Preferably flow from the reservoir to the dose chamber is eliminated when the dose valve is open, for example statically such as a one-way valve, or selectively openable valve, or dynamically such as a restriction.

Preferably such flow elimination is located within the regulator or trigger or is another mechanism.

Preferably closure of the dose valve is at least in part controlled by an elastic element, such as a spring, whether compressive or extensive.

Preferably the dose valve closure is controlled via a mechanism which ties the closure of the dose valve to a specific amount of movement of the pressure front along, or pressure in, the work chamber.

Preferably the working pressure is above 10/a, but below 50% of the maximum pressure of the reservoir.

Alternatively, if the reservoir is an external pressure supply, the working pressure may be equal to that of the external pressure supply, such external pressure supply being regulated as part of the supply to the system.

Preferably the system is portable and is powered by an onboard reservoir.

Preferably the dose valve closure occurs fully independently of any input via the triggering method.

Preferably the operating range of the working pressure is regulated between 13 bar and 60 bar.

Preferably the high-pressure working fluid is non-combustible in use in the system.

In another aspect the present invention consists in a device to operate on a high-pressure working fluid, comprising or including,
  A reservoir of high-pressure working fluid, with a fluid connection supplying the high-pressure working fluid at a working pressure to,
  A dose chamber to contain a volume of high-pressure working fluid,
  A dose valve, biased to close, and able to be triggered open, between the dose chamber and,
  A working chamber, into which a charge of the high pressure working fluid is released from the dose chamber via the dose valve at a first end of the working chamber, to undergo a first expansion in the working chamber and do work therein to or towards a second end of the working chamber, distal from the first end, the dose valve closing again before a pressure front of the charge in the working chamber has travelled less than or equal to halfway between the first end and the second end, thereafter allowing a second expansion of the charge to continue doing work, the fluid connection having a flow restriction which is significantly less than a flow capacity of the dose valve, Wherein when the work is completed, the charge in the working chamber is at a pressure less than or equal to half the working pressure.

Preferably the working pressure is a controlled working pressure.

Preferably the volume of the dose chamber to the working chamber is at a ratio of 1 to 1.

Preferably the volume of the dose chamber to the working chamber is at a ratio range of 1 to 2 and 1 to 20.

Preferably the bias to close the dose valve is derived from fluid pressure, for example pressure acting on a pressure area, or a mechanical spring.

Preferably there is a pressure regulator between the reservoir and the dose chamber.

Preferably the pressure regulator and dose valve ensure the dose chamber consistently has at least one specified pressure or energy state, irrespective of the reservoir pressure while the reservoir is between a maximum allowable pressure and the working pressure.

Preferably the dose chamber is concentric to the working chamber.

Preferably the dose valve is concentric to the working chamber.

Preferably the reservoir could be a self-contained tank, or a tethered supply from a high-pressure fluid source, such as a tank, compressor or the like external pressure supply.

Preferably the charge expands, pushes against and accelerates, a workload and the pressure front lies behind the workload, in the work chamber in order to extract work from the charge.

Preferably the dose valve is opened by a trigger which can be mechanical, pneumatic, electrical or any other means of opening the flow between the dose chamber and work chamber via the dose valve, and may be operated by hand, for example a finger trigger or by a machine.

Preferably the workload is captive, for example a piston or is non-captive for example a projectile.

Alternatively, there is no workload in the chamber as such, but rather the pressure front ejects from the working chamber to cause an effect external to the working chamber.

Preferably flow from the reservoir to the dose chamber is eliminated when the dose valve is open, for example statically such as a one-way valve, or selectively openable valve, or dynamically such as a restriction.

Preferably such flow elimination is located within the regulator or trigger or is another mechanism.

Preferably the dose valve closure is at least in part controlled by an elastic element, such as a spring, whether compressive or extensive.

Preferably the dose valve closure is controlled via a mechanism which ties the closure of the dose valve to a specific amount of movement of the pressure front along, or pressure in, the work chamber.

Preferably the working pressure is above 10%, but below 50% of the maximum pressure of the reservoir.

Alternatively if the reservoir is an external pressure supply, the working pressure may be equal to that of the external pressure supply, such external pressure supply being regulated as part of the supply to the device.

Preferably the device is portable and is powered by an onboard reservoir.

Preferably the dose valve closure occurs fully independently of any input via the triggering method.

Preferably the operating range of the working pressure is regulated between 13 bar and 60 bar.

Preferably the high-pressure working fluid is non-combustible in use in the device.

In another aspect the present invention consists in a method of operating on a high-pressure working fluid, comprising or including, supplying a high-pressure working fluid from a reservoir, at a working pressure, containing a volume of the supplied high-pressure working fluid in a dose chamber, Biasing closed a dose valve, from the dose chamber, Triggering open the dose valve to allow a charge of the high-pressure fluid to flow from the dose chamber into a first end of a working chamber, and undergo a first expansion and do work in the working chamber, Closing the dose valve before a pressure front of the charge has travelled half way down the working chamber from the first end, such that the charge undergoes a second expansion in the working chamber and continues to do work therein, toward a second end of the working chamber, distal from the first end, Restricting a flow of high-pressure working fluid from the reservoir to the dose chamber to significantly to less than a flow of the dose chamber to the working chamber via the dose valve, Wherein when the second expansion reaches the second end the charge is at a pressure less than or equal to half the working pressure.

Preferably the volume of the dose chamber to the working chamber is at a ratio of 1 to 1.

Preferably the volume of the dose chamber to the working chamber is at a ratio range of 1 to 2 and 1 to 20.

Preferably the bias to close the dose valve is derived from fluid pressure, for example pressure acting on a pressure area, or a mechanical spring.

Preferably there is a pressure regulator between the reservoir and the dose chamber, whether onboard the tool, or separate if a tethered supply.

Preferably the pressure regulator and dose valve ensure the dose chamber consistently has at least one specified pressure or energy state, irrespective of the reservoir pressure while the reservoir is between a maximum allowable pressure and the working pressure.

Preferably the dose chamber is concentric to the working chamber.

Preferably the dose valve is concentric to the working chamber.

Preferably the reservoir could be a self-contained tank, or a tethered pressure supply from a high-pressure fluid source, such as a tank, compressor or the like external pressure supply.

Preferably the charge expands, pushes against and accelerates, a workload and the pressure front lies behind the workload, in the work chamber in order to extract work from the charge.

Preferably the dose valve is opened by a trigger which can be mechanical, pneumatic, electrical or any other means of opening the flow between the dose chamber and work chamber via the dose valve, and may be operated by hand, for example a finger trigger or by a machine.

Preferably the workload is captive, for example a piston or is non-captive for example a projectile.

Alternatively, there is no workload in the chamber as such, but rather the pressure front ejects from the working chamber to cause an effect external to the working chamber.

Preferably flow from the reservoir to the dose chamber is eliminated when the dose valve is open, for example statically such as a one-way valve, or selectively openable valve, or dynamically such as a restriction.

Preferably such flow elimination is located within the regulator or trigger or is another mechanism.

Preferably the dose valve closure is at least in part controlled by an elastic element, such as a spring, whether compressive or extensive.

Preferably the dose valve closure is controlled via a mechanism which ties the closure of the dose valve to a specific amount of movement of the pressure front along, or pressure in, the work chamber.

Preferably the working pressure is above 10%, but below 50% of the maximum pressure of the reservoir.

Alternatively if the reservoir is an external pressure supply, the working pressure may be equal to that of the external pressure supply, such external pressure supply being regulated as part of the supply.

Preferably the method includes the step of being portable and powered by an onboard reservoir.

Preferably the dose valve closure occurs fully independently of any input via the triggering method.

Preferably the operating range of the working pressure is regulated between 13 bar and 60 bar.

Preferably the method does not allow combustion of the high-pressure working fluid in use.

In another aspect the present invention may be said to broadly consist in a system as described herein with reference to any one or more of the accompanying drawings.

In another aspect the present invention may be said to broadly consist in a device as described herein with reference to any one or more of the accompanying drawings.

In another aspect the present invention may be said to broadly consist in a method as described herein with reference to any one or more of the accompanying drawings.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be in any sense limiting.

Other aspects of the invention may become apparent from the following description which is given by way of example only and with reference to the accompanying drawings.

BRIEF DESCRIPTION OF THE DRAWINGS

Preferred forms of the present invention will now be described with reference to the accompanying drawings in which;

FIG. 1B shows a stage by stage of operation of the applicant's own prior art device that utilizes a single stage expansion of the high pressure fluid in the working chamber, FIG. 2A Shows a performance graph of pressure behind the piston verses travel of the piston of a prior art device as the nail gun of FIG. 1A for delivering an energy of 250 Joules.

DETAILED DESCRIPTION OF THE INVENTION

Figure 1A:
FIG. 1A shows a schematic view of a prior art system, in this case a nail gun, run with a tether supplying pressurized air from a compressor.

Preferred embodiments will now be described with reference to FIGS. 3 through 11, and discussions on the prior art with reference to FIGS. 1A,B and 2A, B.

Thermodynamic Efficiency

At a certain operating pressure, a measure of energy can be extracted from each 'shot volume' or charge of a high-pressure operating fluid. A simple benchmark is the amount of energy that is liberated by a traditional pneumatic piston, assuming idealised flow, friction, and we ignore ambient pressure.

Work extracted from such a system, assuming ideal conditions as is at most:

$$\begin{aligned}\text{Energy} &= \text{Force} \times \text{Distance} \\ &= (\text{Pressure} \times \text{PressureArea}) \times \text{Distance} \\ &= \text{Pressure} \times (\text{PressureArea} \times \text{Distance}) \\ &= \text{Pressure} \times \text{Volume} \\ &= PV\end{aligned}$$

Now, providing a Single Stage Adiabatic expansion system with that same amount of pressure and volume to use in one cycle, how much energy can it possibly liberate? The ratio will give the relative efficiency of this system compared to the Traditional system above, that traditional system liberating 100% at any given pressure, and with other systems liberating either <100% if less efficient, or >100% if more efficient.

If we set $V_{USED}=1.0$ for simplicity, and allow the gas to expand down to ambient pressure $P_{FINAL}=1.0$ also for simplicity and to show the 'ideal' expansion case, we can find that a single stage adiabatic system can liberate:

$$\text{Energy} = \frac{P\left[\left(P^{\frac{1}{\gamma}}\right)^{1-\gamma} - 1\right]}{1-\gamma}$$

$\gamma \approx 1.4$ for air, nitrogen, oxygen $\gamma \approx 1.3$ for $CO_2$

For any gas, when comparing this idealised version of a single stage adiabatic system to a traditional E=PV system. The adiabatic system has an efficiency below 100% at very low pressures, but efficiencies significantly above 100% at high pressures.

How does the double expansion of the present invention allow access to efficient operation?

Figure 3:
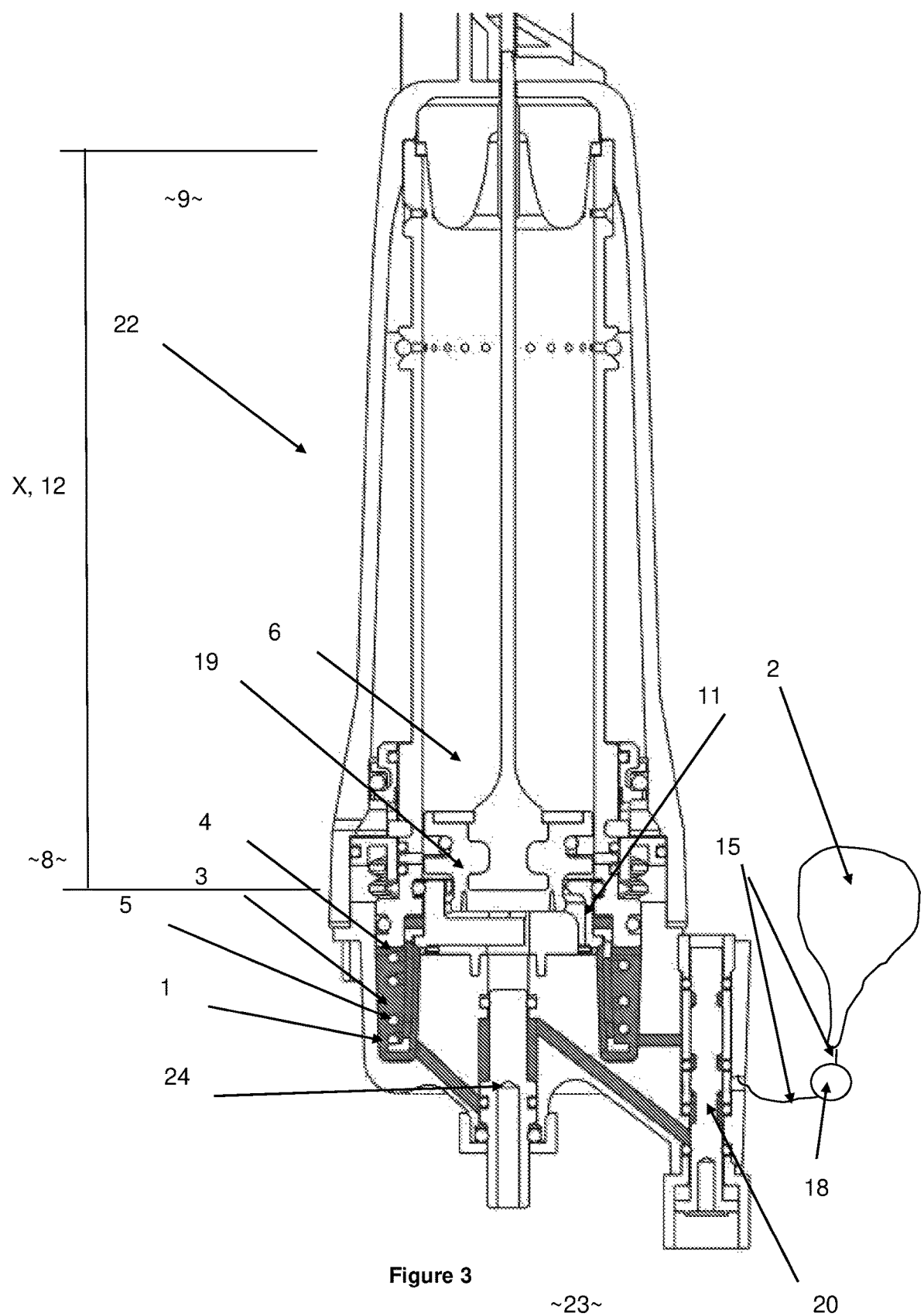
FIG. 3 shows a side cross sectional view of a device or system configured to use, and follow the method of the present invention, in this case for a nail gun also.
Figure 4:
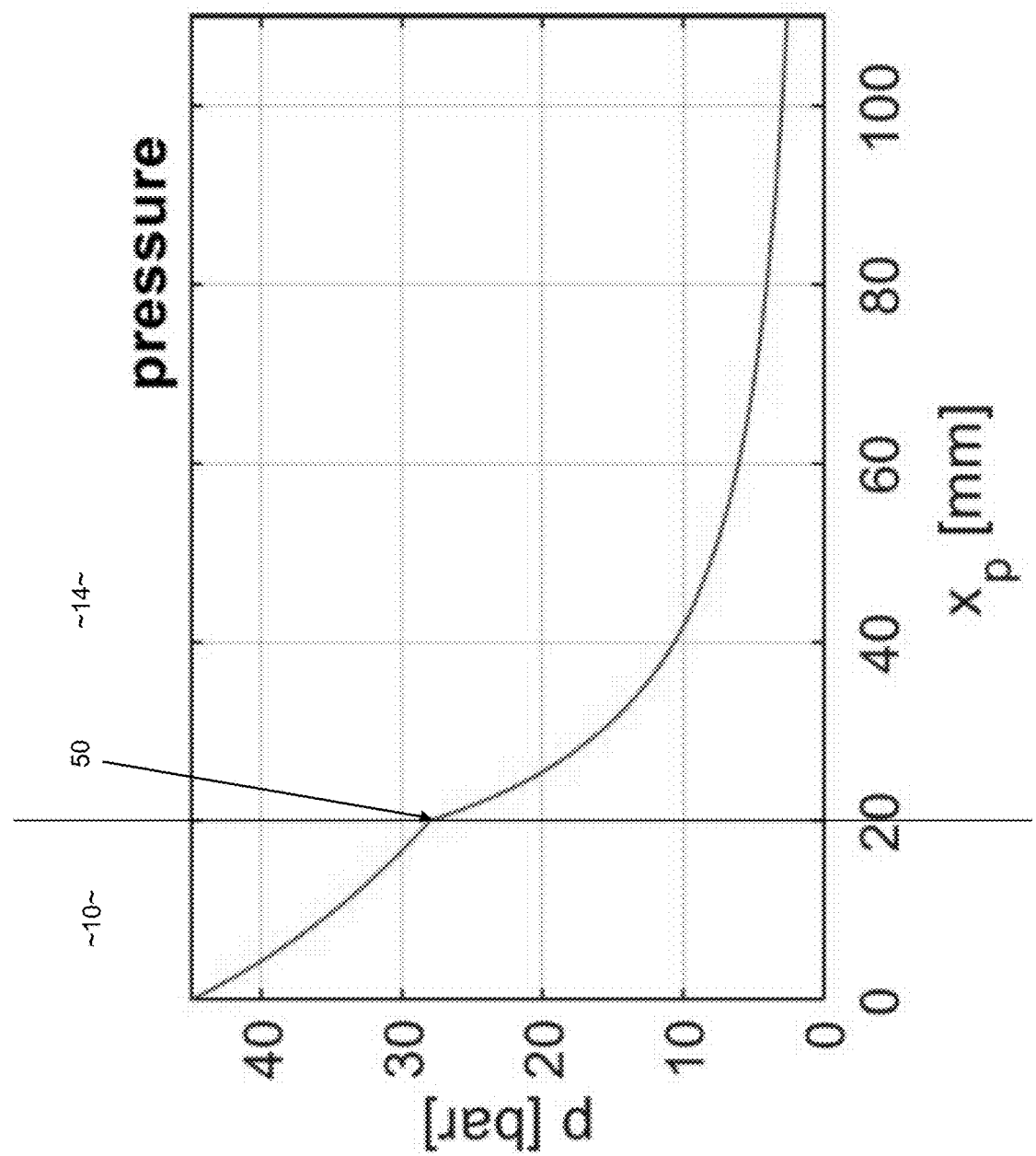
FIG. 4 shows the working fluid pressure (behind the piston) verses displacement of the workload or pressure front along the working chamber as a graph for the device shown in FIG. 3.
Figure 5:
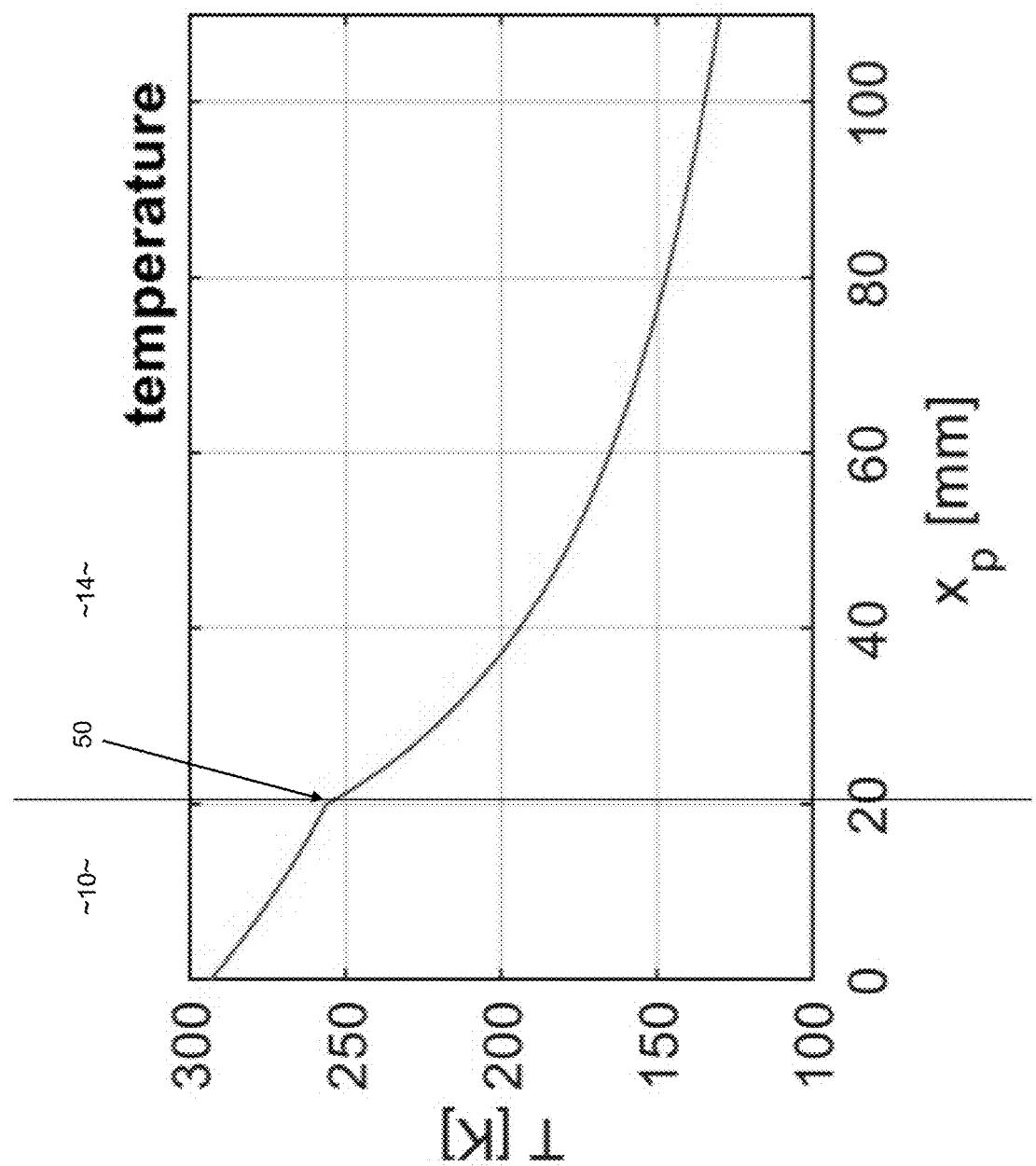
FIG. 5 shows the working fluid temperature verses displacement of the workload or pressure front along the working chamber, again behind the piston, as a graph for the device shown in FIG. 3.

Double expansion is achieved by closing the dose valve 4 shown in FIG. 3 during the expansion event, which truncates the expanding volume to only the working chamber 6 and allows pressure of the charge 7 to drop extremely fast as the pressure front 11 or workload 19 (for example the piston) moves down the working chamber 6, such as shown in FIG. 3 in a ready to trigger or ready to work state. The operation of such a system, its method and a device utilising these is explained shortly.

One of the assumptions presented above was that $P_{FINAL}$ is low (1.0), when a system has a high operating or working pressure (e.g. 15-60 atmospheres) the expansion ratio required to bring the gas down to (or close to) ambient pressure, for example atmospheric (1.013 bar) is very high.

One way to achieve this large expansion ratio is to use a large working chamber in comparison to the volume of the dose chamber to allow for this large expansion ratio, however this is often not feasible within the allowable space/weight envelope for a given system, for example in hand held tools.

Double expansion allows for very high expansion ratios (and therefore >100% relative efficiencies) to be achieved in small, compact, and lightweight systems which don't require large working chambers.

This is the key utility of the application of a high pressure, double expanding adiabatic system—it is able to generate high efficiency and high energy density systems, and high specific energy systems.

A device, system and method in keeping with the present invention will now be described with reference to FIGS. 3 through 12.

The device 22 shown in FIG. 3 operates on a high-pressure working fluid provided from a reservoir 2, in this case shown as a tank, via a fluid connection 15. However, the device 22 could equally be tethered via the fluid connection 15 to an external reservoir 2 supply such as, but not limited to a compressor, directly, or indirectly via a manifold (not shown).

The fluid connection 15 leads to a trigger 20, and optionally, though preferably there is a regulator 18 between the reservoir 2 and the trigger 20, either at some point along the fluid connection 15, or directly connected to the reservoir 2 and from which the fluid connection 15 then extends, or the fluid connection. Alternatively the fluid connection 15 extends from the source (and may well be the tether where the source is a compressor, manifold or similar) to the regulator 18 which then connects into the trigger 20.

The regulator 18 reduces the pressure from the source or reservoir 2 down to the working pressure. For example the reservoir may be at 310 bar and the regulator reduces this to 40 bar working pressure. In the preferred form the regulator 18, or elsewhere in the supply into the device, possibly even up to the dose chamber 3 there also may be a flow restriction that throttles the flow of high-pressure working fluid from the reservoir 2. The flow restriction has a maximum flow rate that is much less that the maximum flow rate of the dose valve 4 when open.

Further controlling the flow of high-pressure working fluid from the source 2 is the trigger 20. When in a standby, or ready to fire position, such as shown in FIG. 3 the trigger allows a fluid connection, throttled, restricted or otherwise, between the reservoir 2 and the dose chamber 3, and fills the volume of the dose chamber 3 with high pressure fluid 1 at the working pressure.

In the device 22 shown there is a workload 19 in a working chamber 6 at rest at a first end 8 of the working chamber 6. The workload 19 in this case is a piston, that is captive within the working chamber 19, and the device may be for example, but not limited to, a nail gun, or pest control trap. In other configurations, the workload 19 may be ejected, such as for example, but not limited to, a ballistic application, launching an item, or similar. In other configurations, there is no physical workload, but rather a pressure wave issues from the working chamber 6 and may act to disturb or otherwise something externally, for example dust control or clearance, snow clearance, pressing one item against another or similar. The working chamber has a length X, 12 within which expansion can occur, this may be the swept path of the workload, such as the piston, projectile, or the length of working chamber within which the pressure wave is confined.

A dose valve 4, bias closed, in this case by a spring 23, prevents the high-pressure working fluid from exiting the dose chamber 3 and thus from entering the working chamber 6. The high pressure working fluid also acts on a hammer 24 on a front side first area thereof and biases this into a ready to fire position as shown, against an equal pressure back side second area thereof, the second side of lower area than the first area.

When actuated, either manually by a user, directly or indirectly, or by, or via, a mechanism, remotely or automatically or controlled by a separate system, the trigger 20 (in this case a sliding spool valve), closes supply of high pressure fluid from the reservoir 2, and then allows the high pressure working fluid acting on the first area of the hammer to vent to reference or atmosphere. This allows the hammer to fire towards the second end 9 and impact the dose valve 4. This impact opens the dose valve 4 and allows a charge of working fluid in enter the working chamber 6 behind, in this case, the workload 19. When the dose valve 4 first opens there is an equalization between the dose chamber 3 and the working chamber 6 as the charge expands into the working chamber, but no work is initially done in this very short time period. The working fluid then undergoes a first expansion 10 and the pressure front 11 of expanding fluid sends the workload, in this case, down the working chamber 6 toward the second end.

As the high-pressure working fluid is undergoing its first expansion from the dose chamber 3 into the working chamber 6, and the pressure front 11, and thus workload 19 move down the working chamber, the dose valve 3 begins to close under action of a bias 5. The dose valve 3 closes before the pressure front 11 reaches at most, half the length of the working chamber 6, that is X/2. At this point no more high-pressure working fluid can enter the working chamber 6 from the dose chamber 3. At this point the charge of working fluid in the working chamber 6 undergoes a second expansion 14, extracting further energy from the charge.

The trigger 20 plays no further role in actuating the device once it has dumped the high-pressure working fluid from the front side first area of the hammer. Its only purpose is to initiate the dose valve 4 opening and it has part to play in how long or far the dose valve 4 opens. The trigger is returned to the ready to fire state (shown in FIG. 3) and the hammer is reset, and the dose chamber 3 if necessary is recharged from the reservoir 2. The pressure front 11, and in this example the workload 19 continues down the working chamber 6. Where the workload 19 is a piston, for example, it compresses gas or fluid in front of it which then aids in returning the workload from the second position back to the first position and the device is ready to fire again.

The pressure, temperature and volume of the charge 7 of working fluid acting in the working chamber 6 will now be described with reference to FIGS. 4 through 10.

It is clear from each of the FIGS. 4 through 10 there are two expansion events occurring, the first expansion 10 and the second expansion 14. The transition of these, seen as the cusp 26 in FIGS. 4, 5, 7, and 8, showing the pressure and temperature denotes where the dose valve 4 closes. This is also visible as a step in FIGS. 6, 9 and 10.

Figure 2A:
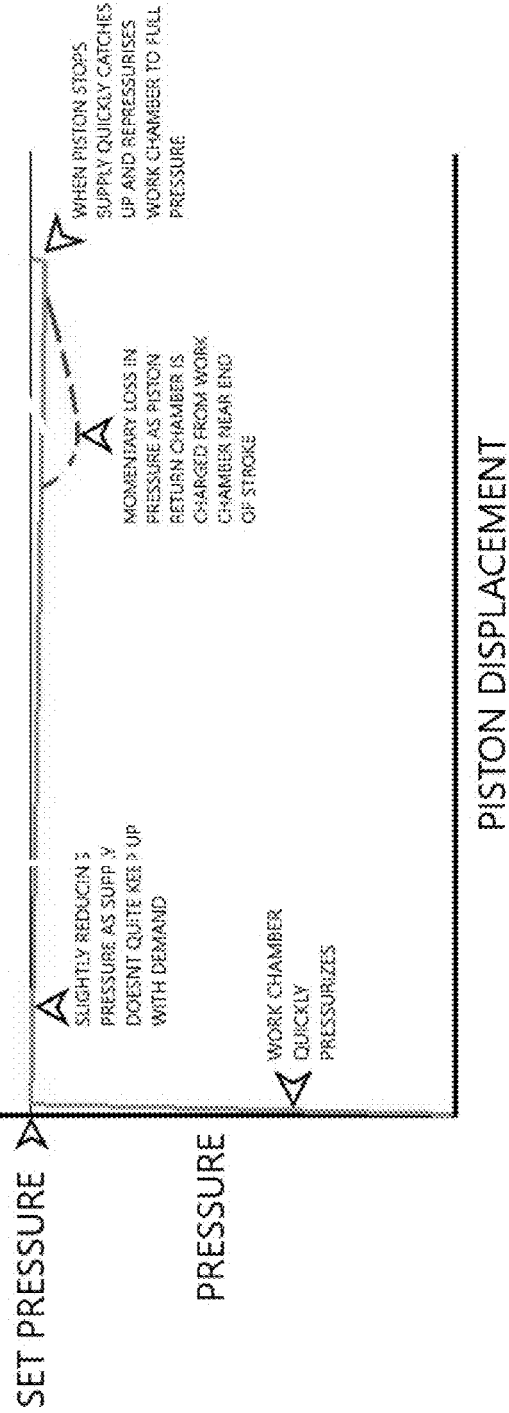
FIG. 2B shows an expansion of the working fluid in the working chamber verses position along the working chamber of the workload of the prior art device in FIG. 1B, the behind piston working fluid pressure verses position for this system is overlaid on FIG. 7.

The timing of the closing of the dose valve 4 is important here, as it allows an initial charge of high-pressure working fluid to leave the dose chamber and enter the working chamber. The charge then undergoes an initial expansion and its pressure front, representing the movable, or unconfined boundary within the working chamber, moves along the working chamber 6. By restricting the open time of the dose valve 4 to less than or equal to the time it takes for the pressure front 11 to travel to half the length 12 of the working chamber 6 then the charge 7 is able to under go two expansion events and release more energy and therefore do more work, than the single expansion event, such as shown in FIGS. 2A and B for prior art systems. The prior art system in FIG. 9 reaches expansion to near 100 cubic centimetres when the pressure front 11 reaches about 75 mm down the working chamber. In contrast the present invention performance reaches about 75 cubic centimetres expansion when it has travelled 110 mm down the working chamber.

Figure 2B:
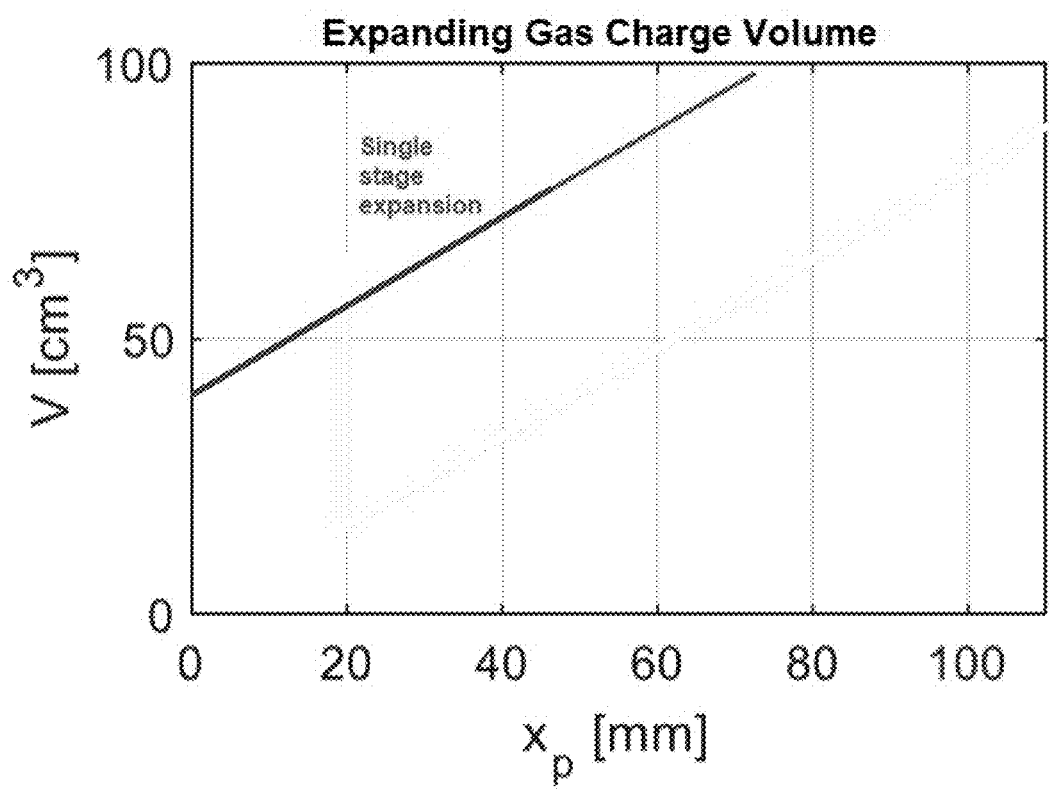
Figure 6:
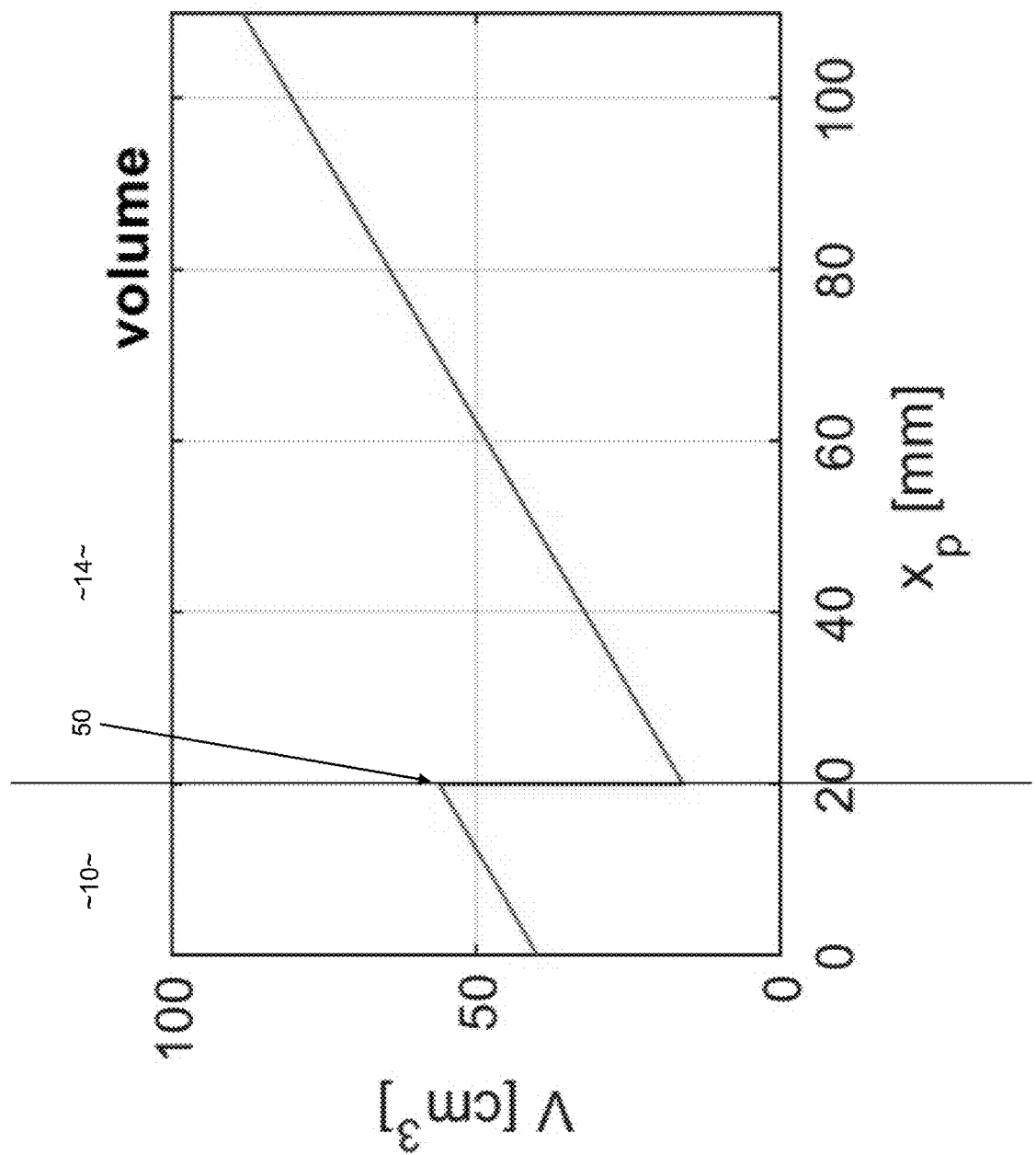
FIG. 6 shows the working fluid volume verses displacement of the workload or pressure front (behind the piston) along the working chamber as a graph for the device shown in FIG. 3.
Figure 9:
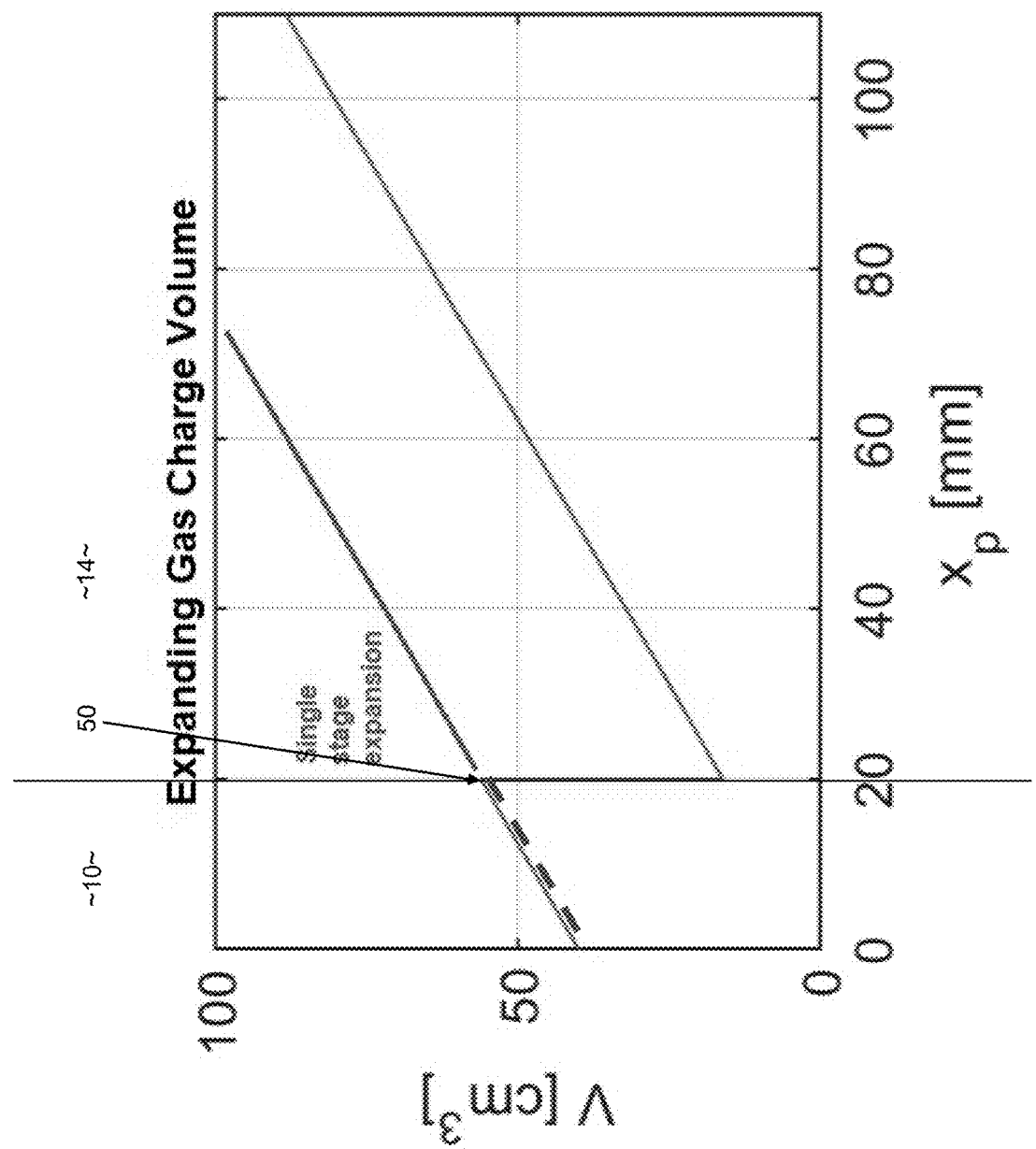
FIG. 9 shows a similar graph to that of FIG. 6 of the working fluid volume verses displacement of the work load or pressure front along the working chamber as a graph for a device shown in FIG. 3, overlaid in red and dashed line with the volume versus displacement for a single stage expansion prior art product (for example that shown in FIG. 1B), to illustrate the improved energy extraction.

Comparing the typical prior art system from that in FIG. 1B and its expansion performance in FIG. 2B to that of the present invention and its expansion performance in FIG. 6, and the overlay of the prior art performance and the present invention in FIG. 9 it is clear the present invention has continued expansion occurring over the full movement of the pressure front 11 (and therefore any workload 19) in the working chamber 6.

Figure 7:
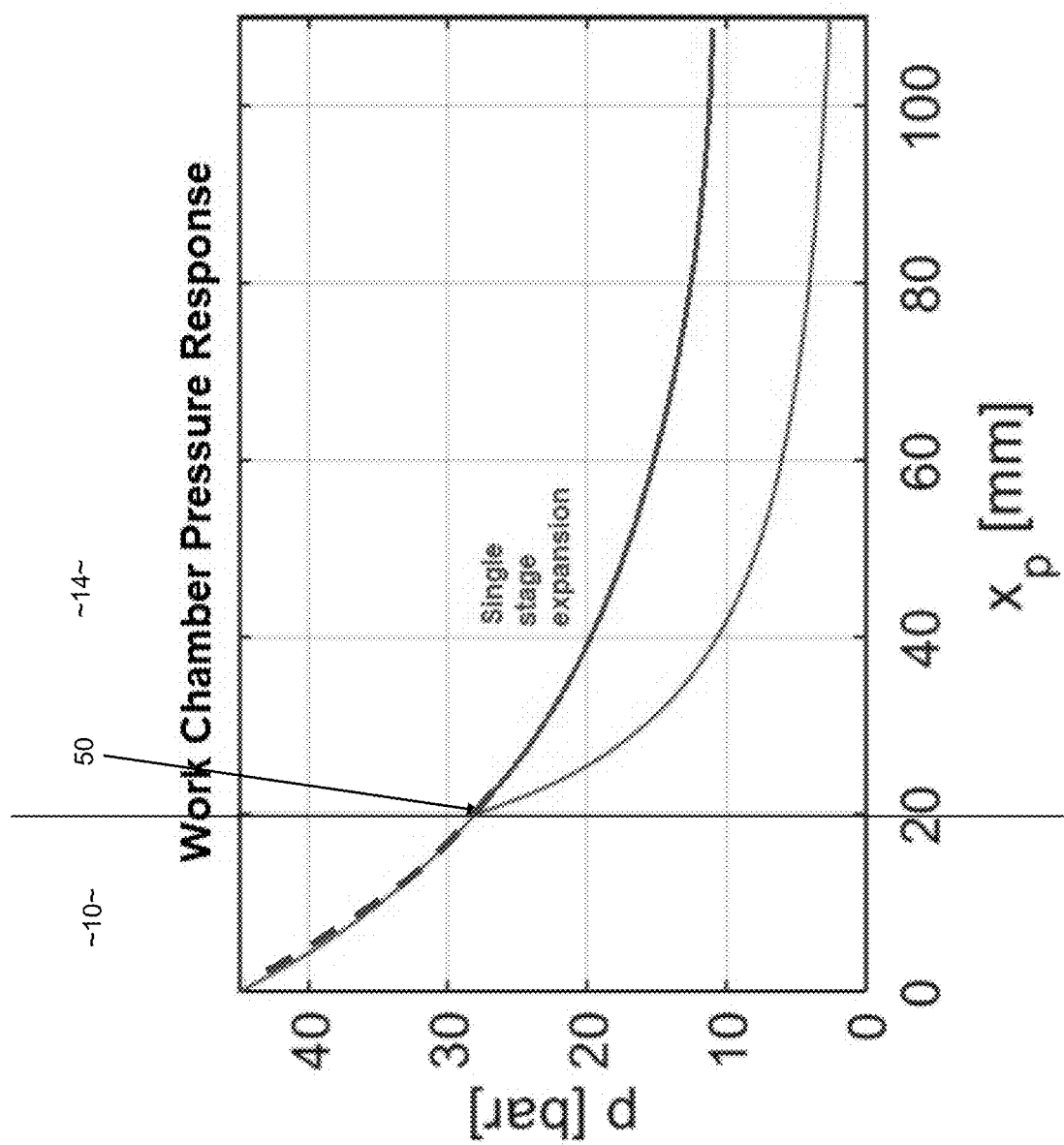
FIG. 7 shows a similar graph to that of FIG. 4 of the working fluid pressure behind the piston verses displacement of the work load or pressure front along the working chamber as a graph for the device shown in FIG. 3, overlaid in red and dashed line with the pressure versus displacement for a single stage expansion prior art product (for example that shown in FIG. 1B), to illustrate the improved energy extraction.
Figure 8:
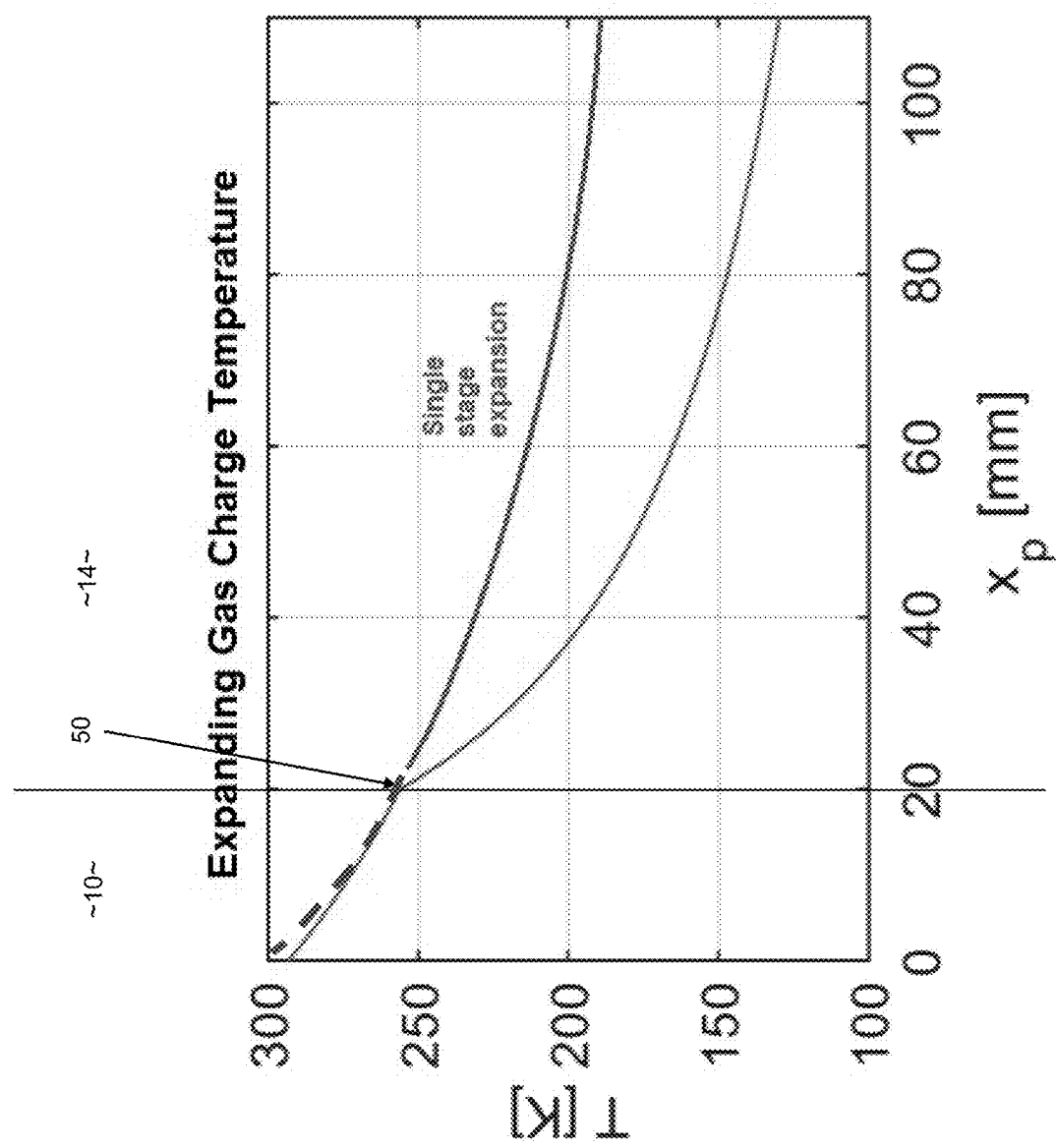
FIG. 8 shows a similar graph to that of FIG. 5 of the working fluid temperature behind the piston verses displacement of the work load or pressure front along the working chamber as a graph for the device shown in FIG. 3, overlaid in red and dashed line with the temperature versus displacement for a single stage expansion prior art product (for example that shown in FIG. 1B), to illustrate the improved energy extraction.

Comparing the pressure and temperature graphs of the single stage expansion of the prior art being the single curve, and the two-stage expansion of the present invention, being the double curve with the cusp 50, in FIGS. 7 and 8 over the length of the working chamber. The use of the pressure in the prior art at the end of the working chamber is about 11-12 bar. In comparison the present invention is much closer to 0 bar (relative to atmospheric), and is about 1 to 2 bar. It is clear the present invention, in this application, uses approximately 10 bar more of the pressure in the charge released into the working chamber. This shows there is a much greater proportion of available energy used, or released, in the present invention over the prior art for the same charge in the working chamber.

Likewise, the temperature graph in FIG. 8 comparing the prior art single stage expansion, being a single curve, and the two stage expansion of the present invention, being the double curve with the cusp 50, shows an energy use advantage in the present invention's favour. For the same geometry the single stage expansion ends at about 175 degrees Kelvin, at full travel. In comparison the present invention with two stage expansion ends at about 75 degrees Kelvin, 100 degrees Kelvin lower. Since temperature is a measure of energy in the charge, then more energy has been used in the present invention, than in the single stage prior art. Thus more energy is extracted from the charge by the present invention for the same gas charge and geometry.

Looking at FIG. 9 we see that the prior art single stage expansion system expands to its maximum well before the full length of the working space. In contrast the present invention undergoes the first expansion 10 and then with the dose valve closing, the second expansion 14, at the knee or cusp 50. The two-stage expansion then goes on to its just under its full expansion at or near the full length of the working space.

This indicates that for the same geometry as the prior art the present invention is more efficient as it extracts more energy for a given charge. Thus, for a given reservoir volume the present invention will allow more cycles, for example more fasteners driven, more pest control cycles, more projectiles discharged, or more pressure waves emitted.

Figure 10:
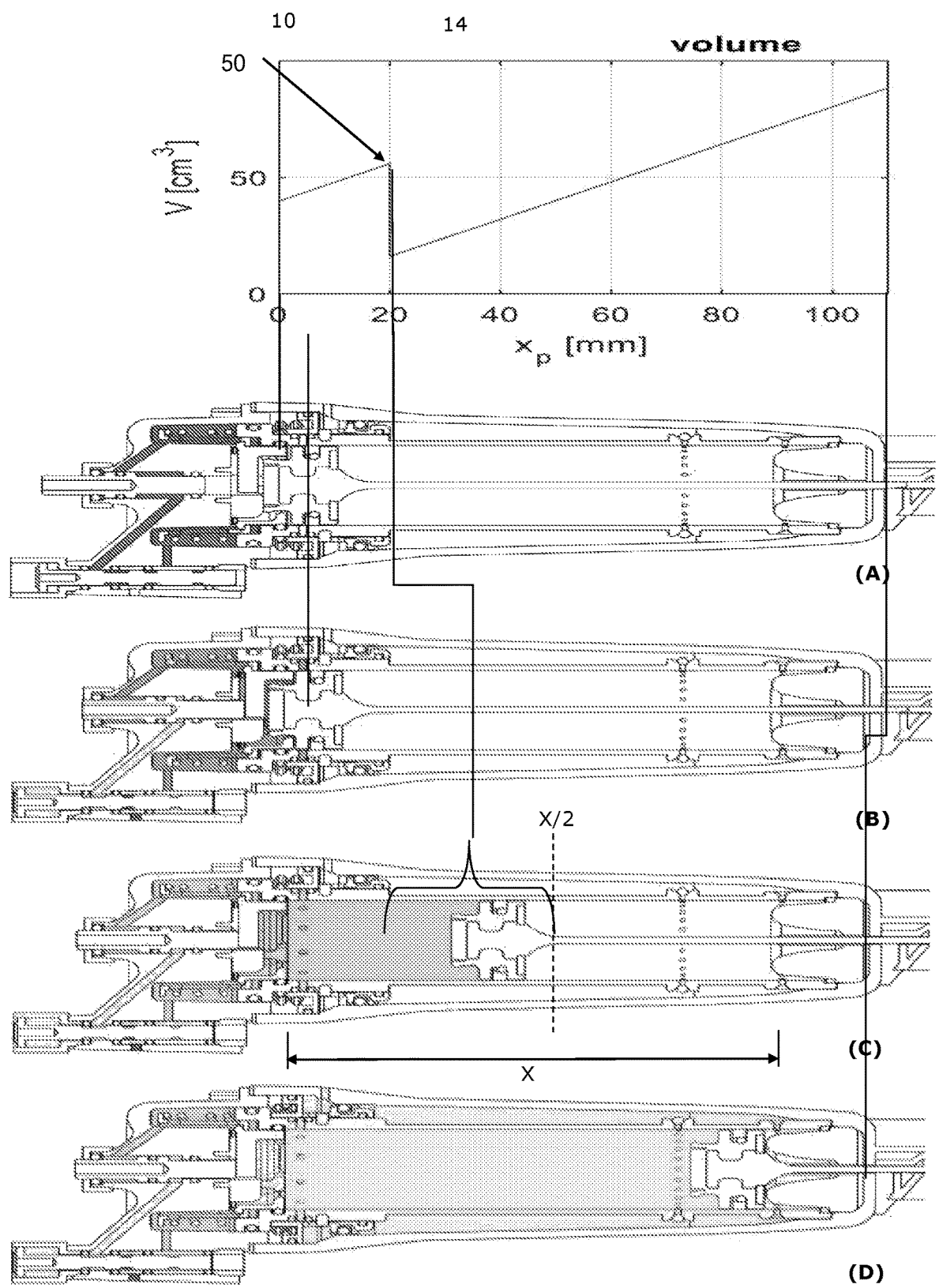
FIG. 10 shows the device of FIG. 3 and the pressure versus displacement graph of FIG. 6 at each stage for (A) prior to opening the dose valve and the workload at the first end, (B) the dose valve opening after triggering and the workload starting movement down the working chamber, (C) the dose valve closing before the workload has moved to half the length of the working chamber, and (D) the workload reaching the end of the work.

The stages of the present method are illustrated in FIG. 10 with the movement of the parts of the device aligned with the volume changes of the charge over the length of the working chamber, and the timing of the system.

The device, as shown from FIG. 3 and in FIG. 10A is ready to fire. The same integers apply here as in FIG. 3 but are omitted for clarity. The dose chamber 3 is full of high-pressure working fluid at the working pressure of about 40 bar, the dose valve 4 is closed and the workload 19, a piston in this case is at the first end 8.

The trigger is actuated in FIG. 10B, and the pressure in front of the hammer 24 is dumped, allowing the hammer 24 to impact the dose valve 4 and open it to allow the charge to enter the working chamber 6 and the pressure front 11 begins to expand down the working chamber 6, in this case acting on the piston to drive it from the first end 8 toward the second end 9. The system's pressures and areas and biases are designed such that the dose valve 4 closes to cut the dose chamber 3 off from the working chamber 6, before the pressure front 11 reaches half the length 12, X of the working chamber 6. In this case the dose valve 4 closes well before this at 20 mm in FIG. 10C. This removes a portion of volume the charge of working fluid could otherwise expand in, that portion of volume being the dose chamber 3, and keeps it confined to the working chamber. This effectively resets the volume available for the charge once the first expansion 10 has occurred.

Once the trigger is actuated, it again has no bearing on the speed or time the dose valve 4 is open and when it closes again, and therefore the rate at which the pressure front will move down the working chamber. This is predetermined and the trigger plays no part in it, other than starting the sequence. This applies independent of the speed with which the trigger is actuated, and whether the trigger is actuated again prior to the cycle being completed.

From 20 mm onward in the example shown the charge expands in the working chamber only as the pressure front moves from the first end 8 toward the second end 9 in FIG. 10D.

Once the pressure front 11, in this case acting on the piston reaches the second end 9 of travel of the working chamber 6 the piston returns due to the pressure in front of it, moving it back to the first end 8. The cycle is complete and the device and system, using this method is ready to actuate again.

Figure 11:
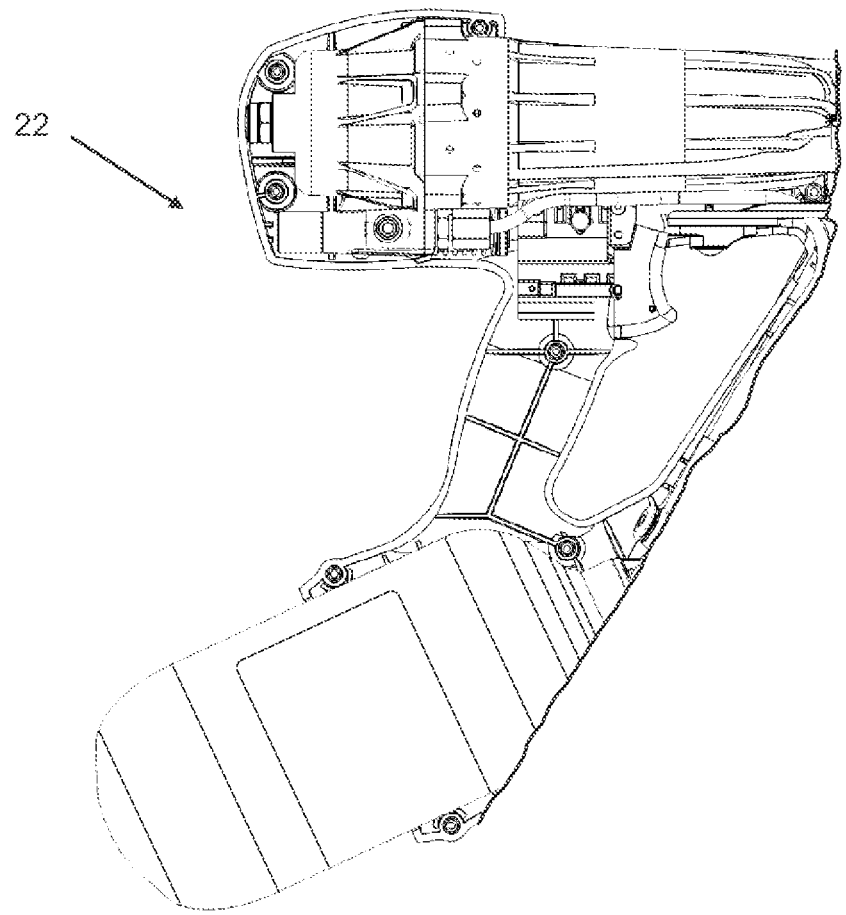
FIG. 11 shows a device that uses the present invention showing its layout in a tether-less nail gun, and, FIG. 12 shows a graph of working fluid pressure (behind the piston in the working chamber) verses time for the device as shown in FIG. 11, the blue line showing the distinct knee of the two stage expansion, and in comparison the orange line shows the pressure behind the piston of the prior art product in FIG. 1B, the data being gathered from physical measurement of a test device configured as per FIG. 11 running the present invention.

A device 22 further encompassing this method and system is shown in FIG. 11, this time as a hand held nail fastener with onboard storage or reservoir 2. This on-board reservoir 2 can be topped up from a separate system, by temporary connection, for example to a tank of compressed air. The device 22 can then be disconnected and used until the reservoir empties to below the working pressure at which point the device will no longer fire. In the image shown the red portion is at storage pressure, the yellow at working pressure, and the blue the pressure as the charge expands.

Figure 12:
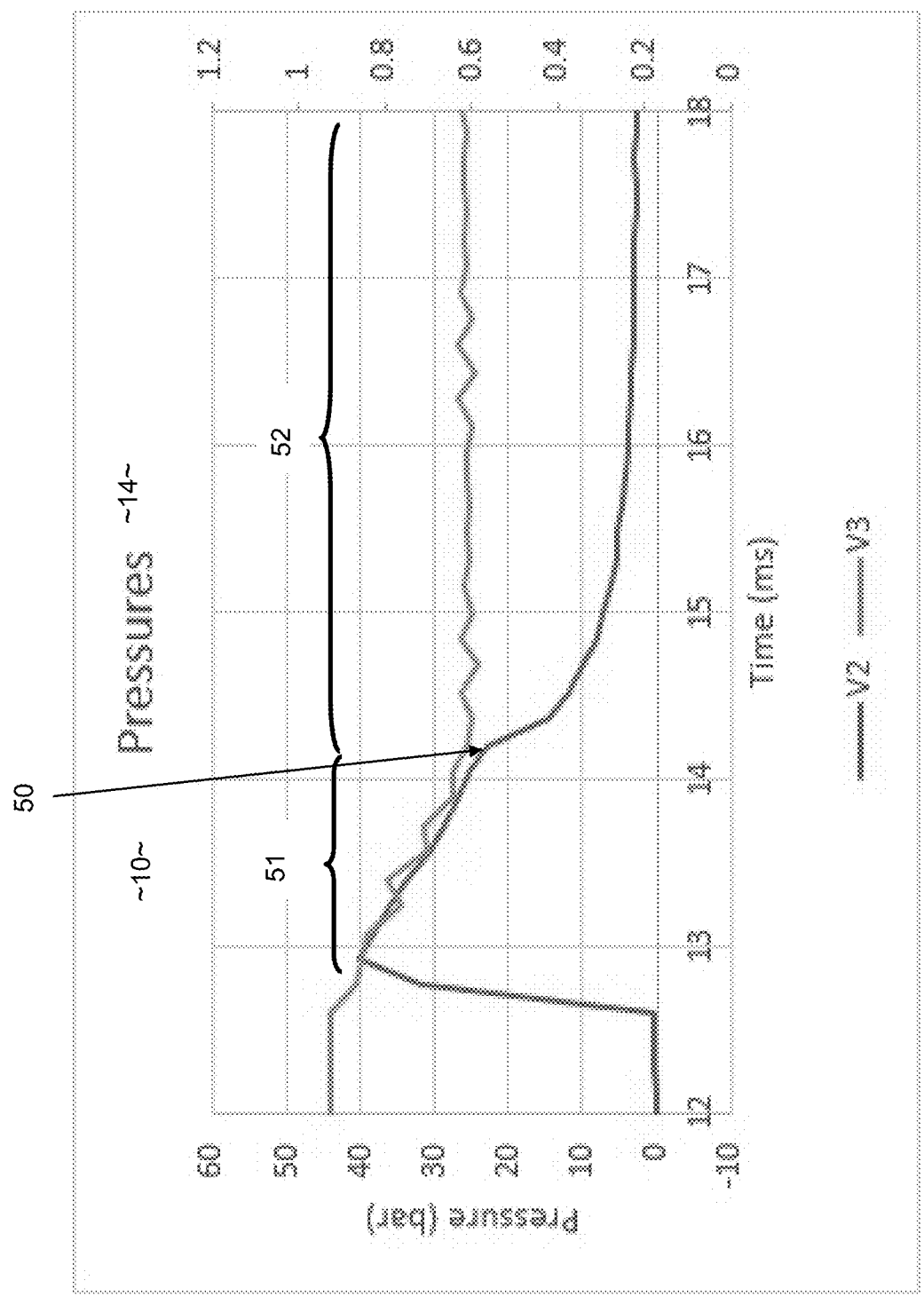

The pressure performance of the device in FIG. 11 is shown in FIG. 12 for pressure (behind the workload 19) verses workload 19 displacement. In this case the workload 19 is the piston the working fluid acts on. The first expansion 51 is as the dose valve 4 is opened, and the working fluid enters the working chamber 6, the piston 19 is moving down the working chamber 6. The dose valve 4 then closes before the pressure front in the working chamber 6 in this case as the workload 19 (the piston) has moved halfway down the work chamber 6 and the second expansion 52 begins. The expansion volume for the working fluid for the second event 52 is therefore reduced to only the working chamber 6, and the workload 19 continues to be driven down the working chamber losing pressure as it does so. At the end of the working stroke, when the work of the charge of working fluid in the working chamber is complete the residual pressure in the working chamber 19 (that is behind the workload 19) is shown as about 4 bar, which is well below the working pressure of, in this case, about 40 bar. In contrast the prior art product, with a working pressure of 40 bar also (shown in the orange line) has a working chamber pressure of about 25 bar and sees little reduction in that pressure before reaching the end of the stroke when the work is done, as can be seen, as it is still sitting at about 25 bar. Therefore, the present invention has used about 21 bar more of pressure for the same stroke length and energy delivery. The prior art product dumping the energy from that 21 bar difference to atmosphere and therefore wasting it the energy in that pressure.

Surrounding the device is atmospheric or reference pressure. If the device is intended to operate at a higher or lower reference pressure, then that is the pressure surrounding the device.

The foregoing description of the invention includes preferred forms thereof. Modifications may be made thereto without departing from the scope of the invention.

The invention claimed is:

1. A system to operate on a high-pressure working fluid, comprising,
    a reservoir of working fluid at high-pressure, with a fluid connection supplying the working fluid at a controlled working pressure to,
    a dose chamber to contain a volume of the working fluid at the working pressure,
    a dose valve, biased to close by a bias, and able to be triggered open, between the dose chamber and,
    a working chamber, into which a charge of the working fluid at the working pressure is released from the dose chamber via the dose valve at a first end of the working chamber, to undergo a first expansion in the working chamber and do work therein to or towards a second end of the working chamber distal from the first end, the dose valve under action of the bias closing again before a pressure front of the charge in the working chamber has travelled less than or equal to halfway between the first end and the second end, thereafter allowing a second expansion of the charge to continue doing work,
    the fluid connection having a flow restriction which is significantly less than a flow capacity of the dose valve,
    wherein when the work is completed, the charge in the working chamber is at a pressure less than or equal to half the working pressure.

2. The system of claim 1, wherein the volume of the dose chamber to a volume of the working chamber is at a ratio of 1 to 1.

3. The system of claim 1, wherein the volume of the dose chamber to a volume of the working chamber is between a ratio range of 1 to 2 and 1 to 20.

4. The system of claim 1, wherein the bias to close the dose valve comprises either fluid pressure acting on a pressure area, or a mechanical spring.

5. The system of claim 1, wherein there is a pressure regulator between the reservoir and the dose chamber, and wherein the pressure regulator and dose valve ensure the dose chamber consistently has the working pressure, irrespective of the reservoir pressure while the reservoir is between a maximum allowable pressure and the working pressure.

6. The system of claim 1, wherein the dose chamber is concentric to the working chamber, and wherein the dose valve is concentric to the working chamber.

7. The system of claim 1, wherein the reservoir is a self-contained tank, or a tethered pressure supply from a separate high-pressure fluid source.

8. The system of claim 1, wherein the charge expands, pushes against and accelerates, a workload and the pressure front lies behind the workload, in the working chamber in order to extract the work from the charge.

9. The system of claim 1, wherein the dose valve is actuated by a hammer associated with a trigger, and the trigger is operated by hand or by a machine.

10. The system of claim 1, wherein a workload in the working chamber is captive or is non-captive, or where there is no workload in the chamber and the pressure front ejects from the working chamber to cause an effect external to the working chamber.

11. The system of claim 1, wherein flow from the reservoir to the dose chamber is eliminated when the dose valve is open, and the flow elimination is located within a regulator or a trigger.

12. The system of claim 1, wherein the bias to close the dose valve is at least in part a compressive or extensive elastic element.

13. The system of claim 1, wherein the dose valve closure is controlled via a mechanism which ties the closure of the dose valve to a specific amount of movement of the pressure front along, or pressure in, the working chamber.

14. The system of claim 1, wherein the working pressure is above 10%, but below 50% of a maximum pressure of the reservoir.

15. The system of claim 1, wherein if the reservoir is an external pressure supply, the working pressure may be equal to that of the external pressure supply, such external pressure supply being regulated as part of the supplying to the dose chamber or wherein the system is portable and the reservoir is an onboard reservoir.

16. The system of claim 1, wherein the dose valve closing occurs fully independently of any triggering input.

17. The system of claim 1, wherein an operating range of the working pressure is regulated between 13 bar and 60 bar.

18. The system of claim 1, wherein the working fluid is non-combustible.

19. A method of operating on a high-pressure working fluid, comprising,
supplying a working fluid from a reservoir at high-pressure, at a working pressure, containing a volume of the supplied working fluid at the working pressure in a dose chamber,
biasing closed a dose valve with a bias, triggering open the dose valve to allow a charge of the working fluid at the working pressure to flow from the dose chamber into a first end of a working chamber, and undergo a first expansion and do work in the working chamber,
closing the dose valve before a pressure front of the charge has travelled half way down the working chamber from the first end, such that the charge undergoes a second expansion in the working chamber and continues to do work therein, toward a second end of the working chamber, distal from the first end,
restricting a flow of the working fluid from the reservoir to the dose chamber to significantly less than a flow from the dose chamber to the working chamber via the dose valve,
wherein when the pressure front reaches the second end, the charge is at a pressure less than or equal to half the working pressure.

20. The method as claimed in claim 19, wherein the volume of the dose chamber to a volume of the working chamber is at a ratio of 1 to 1.

21. The method as claimed in claim 19, wherein the volume of the dose chamber to a volume of the working chamber is at a ratio range of 1 to 2 and 1 to 20.

22. The method as claimed in claim 19, wherein the bias to close the dose valve comprises either fluid pressure, or a mechanical spring.

23. The method as claimed in claim 19, wherein there is a pressure regulator between the reservoir and the dose chamber.

24. The method as claimed in claim 23, wherein the pressure regulator and the dose valve ensure the dose chamber consistently has the working pressure, irrespective of the reservoir pressure, while the high-pressure is between a maximum allowable pressure and the working pressure.

25. The method as claimed in claim 19, wherein the charge expands, pushes against and accelerates, a workload and the pressure front lies behind the workload, in the working chamber in order to extract the work from the charge.

26. The method as claimed in claim 19, wherein the dose valve is actuated by a hammer associated with a trigger, and the trigger is operated by hand or by a machine.

27. The method as claimed in claim 19, wherein a workload in the working chamber is captive, or is non-captive.

28. The method as claimed in claim 19, wherein the pressure front ejects from the working chamber to cause an effect external to the working chamber.

29. The method as claimed in claim 19, wherein flow from the reservoir to the dose chamber is eliminated when the dose valve is open.

30. The method as claimed in claim 19, wherein an operating range of the working pressure is regulated between 13 bar and 60 bar.

* * * * *